United States Patent
Tanaka et al.

(10) Patent No.: US 12,181,735 B2
(45) Date of Patent: Dec. 31, 2024

(54) OPTICAL ELEMENT OR POLARIZING PLATE, AND EYEWEAR USING SAME

(71) Applicant: Nippon Kayaku Kabushiki Kaisha, Tokyo (JP)

(72) Inventors: Kouichi Tanaka, Niigata (JP); Shohei Yoshida, Niigata (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 563 days.

(21) Appl. No.: 17/609,814

(22) PCT Filed: May 13, 2020

(86) PCT No.: PCT/JP2020/019085
§ 371 (c)(1),
(2) Date: Nov. 9, 2021

(87) PCT Pub. No.: WO2020/235413
PCT Pub. Date: Nov. 26, 2020

(65) Prior Publication Data
US 2022/0229315 A1    Jul. 21, 2022

(30) Foreign Application Priority Data
May 17, 2019   (JP) ................................ 2019-093752

(51) Int. Cl.
*G02C 7/10* (2006.01)
*G02C 7/12* (2006.01)
*G02C 11/04* (2006.01)

(52) U.S. Cl.
CPC ............... *G02C 7/104* (2013.01); *G02C 7/12* (2013.01); *G02C 11/04* (2013.01)

(58) Field of Classification Search
CPC .......... G02C 7/104; G02C 7/12; G02C 11/04; G02C 7/021; G02C 2202/16; G02B 5/3033; G02B 27/281
USPC .................................. 351/41, 159.51, 159.56
See application file for complete search history.

(56) References Cited

U.S. PATENT DOCUMENTS

| | | | |
|---|---|---|---|
| 10,267,966 B2 * | 4/2019 | Tamura | ................ G02B 5/3041 |
| 2013/0308078 A1 | 11/2013 | Sato et al. | |
| 2014/0232983 A1 | 8/2014 | Tokumaru et al. | |
| 2017/0160566 A1 | 6/2017 | Tanaka et al. | |

(Continued)

FOREIGN PATENT DOCUMENTS

| | | | | |
|---|---|---|---|---|
| JP | 2013011840 A * | 1/2013 | ............. G02B 5/223 |
| JP | 2015-72396 A | 4/2015 | |
| JP | 2019-56904 A | 4/2019 | |

(Continued)

OTHER PUBLICATIONS

European communication dated May 12, 2023 in corresponding European patent application No. 20808899.7.

(Continued)

*Primary Examiner* — Tuyen Tra
(74) *Attorney, Agent, or Firm* — NIELDS, LEMACK & FRAME, LLC

(57) ABSTRACT

The present invention provides an optical element characterized in that a polarized-light-emitting element for emitting polarized light in the visible region and a non-light-emitting polarizing element for absorbing and/or reflecting light in the visible region are layered.

5 Claims, 3 Drawing Sheets

(56) References Cited

U.S. PATENT DOCUMENTS

2022/0004028 A1* 1/2022 Hayasaki ................. G02C 7/12

FOREIGN PATENT DOCUMENTS

| TW | 201245777 A | 11/2012 |
| TW | 201712377 A | 4/2017 |
| TW | 201809756 A | 3/2018 |
| WO | 2013/051489 A1 | 4/2013 |
| WO | 2016/002582 A1 | 1/2016 |
| WO | 2019/022212 A1 | 1/2019 |
| WO | 2019/058758 A1 | 3/2019 |

OTHER PUBLICATIONS

International Search Report and Written Opinion mailed Jul. 14, 2020 in corresponding PCT application No. PCT/JP2020/019085.
Chinese communication, with English translation, dated Dec. 1, 2023 in corresponding Chinese patent application No. 202080034598.X.

* cited by examiner

OPTICAL ELEMENT OR POLARIZING PLATE, AND EYEWEAR USING SAME

TECHNICAL FIELD

The present invention relates to an element having a polarization function for eyewear and the like.

BACKGROUND ART

For so-called eyewear such as sunglasses and goggles, polarized lenses with a polarization function are used to impart high anti-glare properties. A polarizing element used for the polarized lens is generally obtained by adsorbing and orienting a dichroic pigment, iodine and/or a dichroic dye on a polyvinyl alcohol film. A transparent protective substrate is bonded to both sides of the polarizing element to form a polarizing plate, which is then bent to form a polarized lens. Furthermore, injection polarized lenses lined with polycarbonate resin or polyamide resin by injection molding after bending processing are also widely used for the purpose of improving impact resistance or as a vision correction lens.

Imparting design properties to lenses is generally carried out, and sunglasses in which gradation is applied to lenses and sunglasses in which a mirror coat is applied to surfaces of lenses are commercially available. As shown in Patent Document 1, a technique for using a reflective polarizing film and a color-absorption polarizing film in combination for the purpose of granting a polarized mirror function is disclosed. Further, Patent Document 2 discloses a technique for imparting a mirror layer consisting of cholesteric liquid crystal films.

PRIOR ART DOCUMENTS

Patent Document

Patent Document 1: International Publication No. WO2013/051489 pamphlet
Patent Document 2: International Publication No. WO2016/002582 pamphlet

SUMMARY OF INVENTION

Technical Problem

Until now, for eyewear applications, it has only been possible to impart a function that absorbs or reflects light for the purpose of cutting external light. On the other hand, it was not possible to impart the function of emitting light. This is because the original anti-glare function is damaged when sunglasses emit light. The present invention is intended to provide a polarizing element that combines light emission properties and anti-glare properties in order to impart new functions and design properties to eyewear.

Solution to Problem

As a result of diligent research to solve the aforementioned problems, the inventors have found an optical element with the following configuration and completed the present invention.

The present invention relates to, but is not limited to, the following.

[Invention 1]
An optical element, wherein a polarized light-emitting element that polarizes and emits light in a visible region is laminated with a non-light-emitting polarizing element that absorbs and/or reflects light in the visible region.

[Invention 2]
The optical element according to Invention 1, wherein a light-emitting polarizing axis of the polarized light-emitting element is orthogonal to a polarizing axis of the non-light-emitting polarizing element.

[Invention 3]
The optical element according to Invention 1 or 2, wherein the polarized light-emitting element and the non-light-emitting polarizing element are laminated via an adhesive layer.

[Invention 4]
The optical element according to any one of Inventions 1 to 3, wherein the polarized light-emitting element and the non-light-emitting polarizing element are laminated via a support.

[Invention 5]
A polarizing plate, comprising a substrate provided on at least one side of the optical element according to any one of Inventions 1 to 4.

[Invention 6]
The polarizing plate according to Invention 5, wherein a substrate provided on a polarized light-emitting element side has a light transmittance of 50% or more at a wavelength necessary for polarized light emission.

[Invention 7]
An eyewear lens, comprising the optical element according to any one of Inventions 1 to 4 or the polarizing plate according to Invention 5 or 6, wherein the polarized light-emitting element is disposed outside.

[Invention 8]
Eyewear comprising the eyewear lens according to Invention 7.

Advantageous Effects of Invention

The present invention enables to provide a polarizing element that combines light emission properties and anti-glare properties.

DESCRIPTION OF EMBODIMENTS

Figure 1:
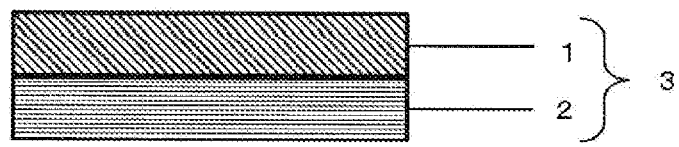
FIG. 1 is a configuration diagram of an optical element of the present invention.

An optical element of the present invention comprises a laminate of a polarized light-emitting element that polarizes and emits light in the visible region and a non-light-emitting polarizing element that absorbs and/or reflects light in the visible region. The non-light-emitting polarizing element used in the present invention includes an absorption polarizing element that absorbs visible light polarization and a reflection polarizing element that reflects visible light polarization. The absorption polarizing element generally consists of a dichroic pigment, iodine and/or a dichroic dye that are adsorbed and oriented on a polyvinyl alcohol film, and can be used for polarizing plates normally used in polarized sunglasses and liquid crystal displays. Examples of reflection polarizing elements include wire-grid polarizing elements with fine unevenness on the surface, birefringent interference polarizing elements consisting of laminated multiple films with different birefringence, and polarizing elements using cholesteric liquid crystals. Since the non-light-emitting polarizing elements are disposed on the eyeball side when made into eyewear, it is preferable to use absorption polarizing elements in order to prevent the light entering through the gap between the eyewear and the eye from being reflected and causing glare.

An absorption polarizing element may reflect some visible light polarization, and a reflection polarizing element may absorb some visible light polarization.

The polarizing light-emitting element used in the present invention is a polarized light-emitting element with at least one polarizing light-emitting pigment oriented so as to be capable of polarizing and emitting light by utilizing the absorption of light, preferably including ultraviolet light. Higher degree of polarization of the emitted light is preferable because the absorption efficiency of the polarizing element is improved. The degree of the change can be indicated by the value of the order parameter (OPD) calculated by the following formula (I) at the wavelength where the polarization effect exhibited by the polarizing light-emitting pigment is highest in the wavelength region of the absorbed light, and is preferably 0.50 to 1.00, and more preferably 0.81 to 0.95.

[Expression 1]

$$OPD = \frac{A_{PARA} - A_{CROSS}}{A_{PARA} + 2 \times A_{CROSS}} \quad \text{Formula (I)}$$

Ky in the formula (I) represents the light transmittance when light polarized orthogonally to the axis showing the highest light absorption is incident on the polarized light-emitting element. Kz represents the light transmittance when light polarized in parallel to the axis showing the highest light absorption is incident on the polarized light-emitting element.

A polarized light-emitting pigment capable of polarizing and emitting light by utilizing the absorption of light generally belongs to fluorescent pigments or phosphorescent pigments, but specifically refers to a pigment that can absorb a specific light and convert it into light-emitting energy by utilizing the light. As such pigments, either fluorescent pigments or phosphorescent pigments may be used, but it is suitable to use fluorescent pigments. The pigments are sometimes called wavelength-converting pigments because the wavelength of the absorbed light is often different from that of the emitted light. Thus, at least one polarized light-emitting pigment contained in the polarized light-emitting element preferably has fluorescent emission properties, and more preferably has fluorescent emission properties, particularly capable of polarizing and emitting light in the visible region by absorbing light in the ultraviolet region to near-ultraviolet visible region.

When orientated on the substrate, the polarized light-emitting pigment, like a dichroic pigment, has optical absorption anisotropy between an axis oriented on the substrate and a perpendicular axis thereof, and exhibits light absorption anisotropy, in other words, polarization function.

Focusing on the transmittance at each wavelength of the polarizing light-emitting pigment that exhibits the polarization function, Kz is the light transmittance (i.e., the transmittance in the axis with the least amount of light transmission) when light polarized in parallel to the axis showing the highest light absorption is incident on the polarized light-emitting element with the polarized light-emitting pigment oriented, while Ky is the light transmittance (i.e., the transmittance in the axis with the most amount of light transmission) when light polarized orthogonally to the axis showing the highest absorption is incident on the polarized light-emitting element with the polarized light-emitting pigment oriented. Then, the order parameter, i.e., the degree of orientation order, can be calculated by substituting these Ky and Kz into the formula (I).

The value of the order parameter (degree of orientation order) is commonly used as an index to measure the orientation of materials such as liquid crystals, and the higher the value of the order parameter, the higher the orientation order the polarized light-emitting element has. In general, the formula for calculating the values of the order parameters is expressed as in the following formula (II) (see "Display Materials and Functional Dyes (CMC Publishing, supervised by Hiroyuki Nakazumi, 2004, p. 65)"), and converting formula (II) leads to the following formula (III). By further converting this formula (III), the value of the order parameter (OPD) can be expressed in the formula (I). In formula (II) and formula (III), $A_{PARA}$ is the absorbance in the direction parallel to the absorbing axis of the oriented polarized light-emitting pigment, and $A_{CROSS}$ is the absorbance in the direction orthogonal to the absorbing axis of the oriented pigment. Each absorbance is calculated by Log(A). In formula (III), formula (I) is derived by substituting the absorbance obtained by Ky and Kz for the respective absorbance calculated by Log (A). Based on this formula (I), the degree of orientation orders of pigments capable of polarizing and emitting light can be controlled by utilizing the absorption of light, thereby obtaining a polarized light-emitting element that exhibits polarized light emission with high contrast values. The higher the value of the order parameter, the more preferable it is. However, for production purposes, it is more preferable that the upper limit of the value of the order parameter be set to 0.95 in order to obtain a light-emitting polarizing plate that exhibits polarized light emission with stable and high contrast. Specifically, the value of the order parameter may be controlled preferably in the range of 0.50 to 1.00, more preferably in the range of 0.81 to 0.95, and still more preferably in the range of 0.85 to 0.94.

[Expression 2]

$$OPD = \frac{A_{PARA} - A_{CROSS}}{A_{PARA} + 2 \times A_{CROSS}} \quad \text{Formula (II)}$$

[Expression 3]

$$OPD = \frac{\frac{A_{PARA}}{A_{CROSS}} - 1}{\frac{A_{PARA}}{A_{CROSS}} + 2}$$ Formula (III)

The polarized light-emitting element that exhibits polarized light emission is obtained by inclusion of the polarized light-emitting pigment in a substrate using one or more polarized light-emitting pigments and orientation thereof. Such polarized light-emitting elements exhibit a variety of light-emitting colors by adjusting the blending ratio of polarized light-emitting pigments. For example, if the absolute value of hue a* is 5 or less and the absolute value of hue b* is 5 or less, as measured in accordance with JIS Z 8781-4:2013, the emitted color from the polarizing light-emitting element is white. The hue a* value and hue b* value in accordance with the standards of JIS Z 8781-4:2013 are commonly used as indexes of the hue of light.

<Polarized Light-Emitting Pigment>

The polarized light-emitting pigment is preferably a compound with a stilbene skeleton or a biphenyl skeleton as a basic skeleton, or a salt thereof. The polarized light-emitting pigments with such a basic skeleton exhibit fluorescent emission properties, and are oriented on the substrate in such a way that the value of the order parameter is controlled in the range of 0.50 to 1.00, thereby emitting light with a higher polarization than other polarized light-emitting pigments, i.e., light with a higher contrast. The stilbene skeleton and the biphenyl skeleton as the basic skeleton of the polarized light-emitting pigment each exhibit fluorescent emission properties themselves, and have the effect of exhibiting high dichroism by orientation on the substrate. Since this effect is due to the structure of each basic skeleton of the stilbene skeleton and the biphenyl skeleton, any additional substituents may be bonded to the basic skeleton structure. However, when an azo group is substituted in the basic skeleton structure, the position of the substitution is important in order to obtain the desired amount of light emission. The polarized light-emitting pigment may be used in a single type alone or in combination with two or more types.

As mentioned above, the polarized light-emitting pigment preferably has fluorescent emission properties capable of polarizing and emitting light in the visible region by absorbing light in the ultraviolet to near-ultraviolet visible region. Specifically, the polarized light-emitting pigment is included in the substrate and then irradiated with light in the ultraviolet region to near-ultraviolet visible region, thereby preferably exhibiting polarized light emission with an emission intensity of 0.04 µW/cm² or more in the visible region (generally 380 to 780 nm), such as a wavelength region of 400 to 700 nm, more preferably exhibiting the polarized light emission with an emission intensity of 0.05 µW/cm² or more, and still more preferably exhibiting the polarized light emission with an emission intensity of 0.1 µW/cm² or more. Although ultraviolet light generally means light in the wavelength region of 400 nm or less, light in the wavelength region of 430 nm or less is also remarkably low in terms of human visual sensitivity. Therefore, light in the ultraviolet region to near-ultraviolet-visible region can be defined as light that is invisible to the human eye. For example, light absorbed by a polarizing light-emitting pigment is preferably in the wavelength region of 300 to 430 nm. By using a polarized light-emitting pigment, it is possible to obtain a polarized light-emitting element capable of polarizing and emitting light by absorbing invisible light.

(a) Polarized Light-Emitting Pigment with Stilbene Skeleton

The polarized light-emitting pigment with a stilbene skeleton is preferably a compound represented by the following formula (1) or a salt thereof.

[Formula 1]

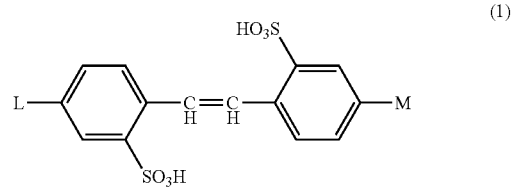

In the formula (1), L and M are, for example, each independently selected from the group consisting of a nitro group, an amino group optionally having a substituent, a carbonylamide group optionally having a substituent, a naphthotriazole group optionally having a substituent, a $C_1$-$C_{20}$ (1-20 carbon atoms) alkyl group optionally having a substituent, a vinyl group optionally having a substituent, an amide group optionally having a substituent, a ureido group optionally having a substituent, an aryl group optionally having a substituent, and a carbonyl group optionally having a substituent, but are not limited thereto. The compound with a stilbene skeleton shown in formula (1) exhibits fluorescent emission, and dichroism can be obtained by orientation. Since the light emission properties are attributed to the stilbene skeleton, the substituents to which each of the L and M groups can be bonded are not particularly limited and can be any substituents. The substituents preferably do not have azo groups.

Examples of each of the "substituents" include, but not limited to, the following:
  amino groups;
  nitro groups;
  cyano groups;
  hydroxyl groups;
  sulfonic acid groups;
  phosphoric acid groups
  carboxyl groups;
  carboxyalkyl groups such as methylcarboxyl group and ethylcarboxyl group;
  halogen atoms such as fluorine atoms, chlorine atoms, bromine atoms, and iodine atoms;
  alkoxy groups such as methoxy groups, ethoxy groups, and propoxy groups;
  aryloxy groups such as phenoxy groups and naphthoxy groups;
  $C_1$-$C_{20}$ alkyl groups such as methyl groups, ethyl groups, n-butyl groups, n-hexyl groups, n-octyl groups, n-dodecyl groups, isopropyl groups, sec-butyl groups, tert-butyl groups, cyclohexyl groups, and cyclopentyl groups;
  aryl groups such as phenyl groups, naphthyl groups, anthracenyl groups, biphenyl groups, and five- or six-membered heterocyclic group containing one to three hetero atoms selected from the group consisting of nitrogen atoms, oxygen atoms, and sulfur atoms as ring component atoms;
  $C_1$-$C_{20}$ alkylcarbonyl groups such as methylcarbonyl groups, ethylcarbonyl groups, and n-butylcarbonyl groups;

arylcarbonyl groups such as phenyl carbonyl groups, biphenyl carbonyl groups, and naphthyl carbonyl groups;

$C_1$-$C_{20}$ alkylsulfonyl groups, such as methylsulfonyl groups, ethylsulfonyl groups, propylsulfonyl groups, and n-butyl-sulfonyl groups; and arylsulfonyl groups such as phenylsulfonyl groups and naphthyl sulfonyl groups.

These substituents may have further substituents, and are described as the further substituents. The number of such chains of substitutions is not limited. For example, Compound Example 1-5, which will be illustrated later, have an amino group as a substituent; the amino group has a triazine group as a substituent; the triazine group has two amino groups as substituents; one of the amino groups has a phenyl group as a substituent; the phenyl group has a sulfonic acid group as a substituent; the other of the amino groups has an amino group as a substituent; the amino group has two ethyl groups as substituents; and both ethyl groups have hydroxy groups as substituents.

Examples of amino groups optionally having substituents include the following:

non-substituted amino groups;

$C_1$-$C_{20}$ alkylamino groups optionally having substituents such as methylamino groups, ethylamino groups, n-butylamino groups, tert-butylamino groups, n-hexylamino groups, dodecylamino groups, dimethylamino groups, diethylamino groups, di-n-butylamino groups, ethylmethylamino groups, and ethylhexylamino groups;

arylamino groups optionally having substituents such as phenylamino groups, diphenylamino groups, naphthylamino groups, and N-phenyl-N-naphthylamino groups;

$C_1$-$C_{20}$ alkylcarbonylamino groups optionally having substituents such as methylcarbonylamino groups, ethylcarbonylamino groups, and n-butylcarbonylamino groups;

arylcarbonylamino groups optionally having substituents such as phenylcarbonylamino groups, biphenylcarbonylamino groups, and naphthylcarbonylamino groups;

$C_1$-$C_{20}$ alkylsulfonylamino groups such as methylsulfonylamino groups, ethylsulfonylamino groups, propylsulfonylamino groups, and n-butyl-sulfonylamino groups; and arylsulfonylamino groups optionally having substituents such as phenylsulfonylamino groups and naphthylsulfonylamino groups.

Among these amino groups, $C_1$-$C_{20}$ alkylcarbonylamino groups optionally having substituents, arylcarbonylamino groups optionally having substituents, $C_1$-$C_{20}$ alkylsulfonylamino groups, and arylsulfonylamino groups optionally having substituents are preferable.

Examples of carbonylamide groups optionally having substituents include N-methyl-carbonylamide groups (—CONHCH$_3$), N-ethyl-carbonylamide groups (—CONHC$_2$H$_5$), and N-phenyl-carbonylamide groups (—CONHC$_6$H$_5$).

Examples of $C_1$-$C_{20}$ alkyl groups of the $C_1$-$C_{20}$ alkyl groups optionally having substituents include linear $C_1$-$C_{12}$ alkyl groups such as methyl groups, ethyl groups, n-butyl groups, n-hexyl groups, n-octyl groups, and n-dodecyl groups; branched-chain $C_3$-$C_{10}$ alkyl groups such as isopropyl groups, sec-butyl groups, and tert-butyl groups; and cyclic $C_3$-$C_7$ alkyl groups such as cyclohexyl groups and cyclopentyl groups. Among these, linear or branched-chain alkyl groups are preferable, and linear alkyl groups are more preferable.

Examples of vinyl groups optionally having substituents include ethenyl groups, styryl groups, vinyl groups that have alkyl groups, vinyl groups that have alkoxy groups, divinyl groups, and pentadienyl groups.

Examples of amide groups optionally having substituents include acetamide groups (—NHCOCH$_3$) and benzamide groups (—NHCOC$_6$H$_5$).

Examples of ureido groups optionally having substituents include monoalkyl ureido groups, dialkyl ureido groups, monoaryl ureido groups, and diaryl ureido groups.

Examples of aryl groups of aryl groups optionally having substituents include phenyl groups, naphthyl groups, anthracenyl groups, biphenyl groups, and $C_6$-$C_{12}$ aryl groups are preferable. Aryl groups may be five- or six-membered heterocyclic group containing one to three hetero atoms selected from the group consisting of nitrogen atoms, oxygen atoms, and sulfur atoms as ring component atoms. Among such heterocyclic groups, the heterocyclic group containing atoms selected from nitrogen atoms and sulfur atoms as ring component atoms is preferable.

Examples of carbonyl groups optionally having substituents include methylcarbonyl groups, ethylcarbonyl groups, n-butyl-carbonyl groups, and phenylcarbonyl groups.

Examples of the compounds shown in formula (1) include the Kayaphor series (manufactured by Nippon Kayaku Co., Ltd.), the Whitex series (manufactured by SUMITOMO CHEMICAL COMPANY, LIMITE.) such as Whitex RP, and the compounds shown in formula (1) are illustrated but not limited to the following.

Compound Example 1

[Formula 2]

(Compound example 1-1)

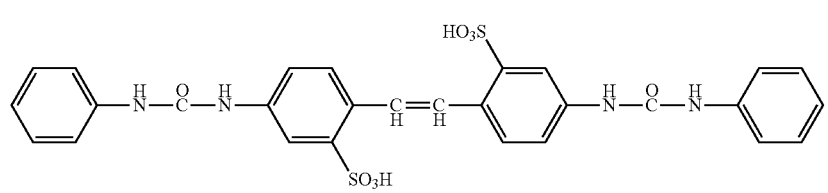

-continued
(Compound example 1-2)
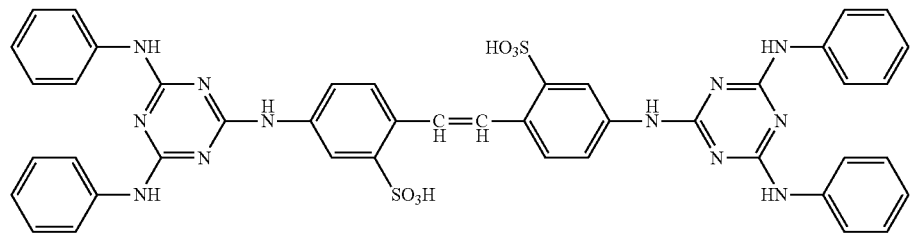
(Compound example 1-3)
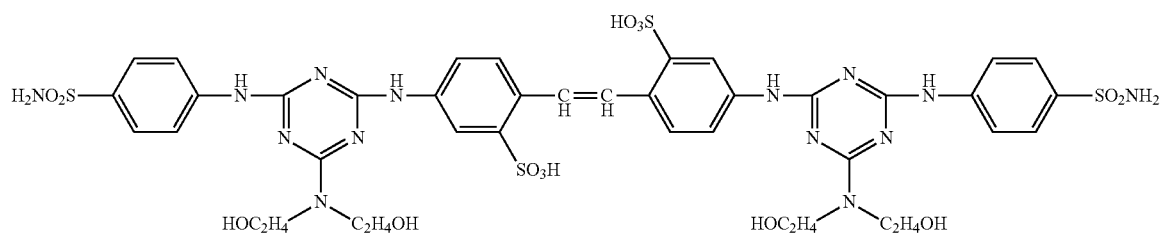
(Compound example 1-4)
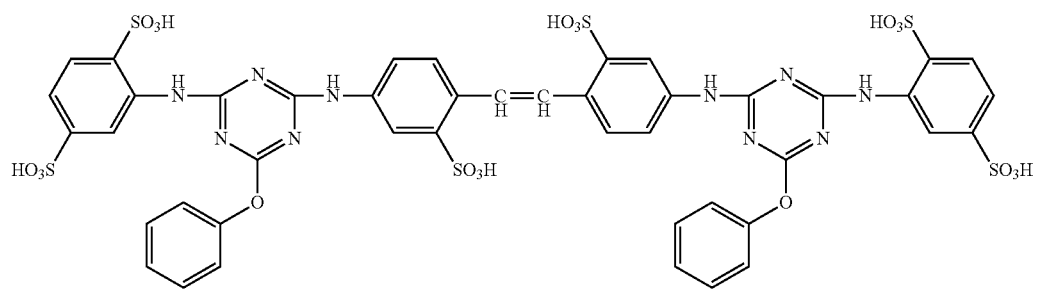
(Compound example 1-5)
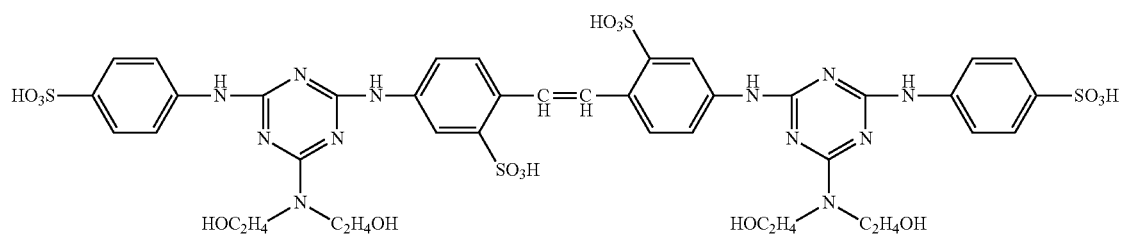
(Compound example 1-6)
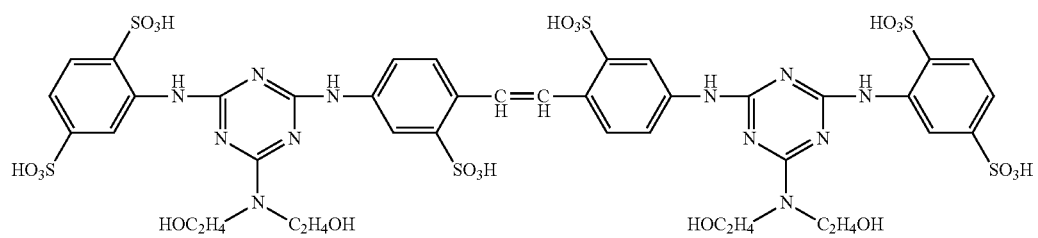

The other compounds with a stilbene skeleton are preferably compounds shown in the following formula (2) or formula (3), or salts thereof. By using these compounds, polarized light-emitting elements with clearer white light emission can be obtained. The compounds shown in the following formula (2) and formula (3) also exhibit fluorescent emission due to the stilbene skeleton, and dichroism can be obtained by orientation.

[Formula 3]

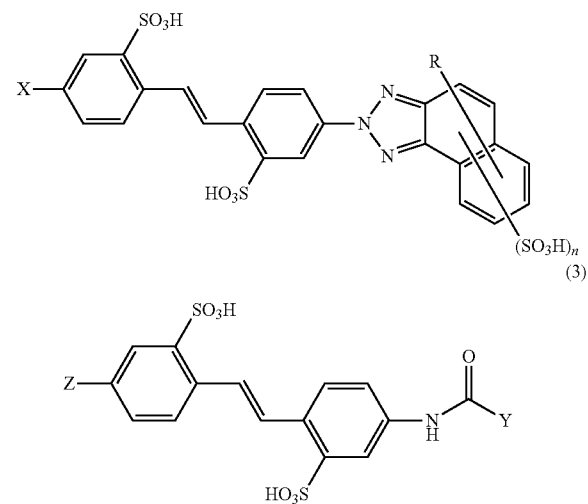

In the formula (2), X represents a nitro group or an amino group optionally having a substituent. The amino group optionally having a substituent is defined in the same way as the amino group optionally having a substituent in the formula (1). Among these, X is preferably a nitro group, a $C_1$-$C_{20}$ alkylcarbonylamino group optionally having a substituent, an arylcarbonylamino group optionally having a substituent, a $C_1$-$C_{20}$ alkylsulfonylamino group, or an arylsulfonylamino group optionally having a substituent, and in particular, a nitro group is more preferable.

In the formula (2), R represents a hydrogen atom, a halogen atom such as a chlorine atom, a bromine atom, or a fluorine atom, a hydroxyl group, a carboxyl group, a nitro group, an alkyl group optionally having a substituent, an alkoxy group optionally having a substituent, or an amino group optionally having a substituent. The alkyl group optionally having a substituent is defined in the same way as the $C_1$-$C_{20}$ alkyl group optionally having a substituent in the formula (1). The alkoxy group optionally having a substituent is preferably a methoxy group, an ethoxy group, or the like. The amino group optionally having a substituent is defined in the same way as the amino group optionally having a substituent in the formula (1), and is preferably a methylamino group, a dimethylamino group, an ethylamino group, a diethylamino group, or a phenylamino group. Among these, R is preferably a hydrogen atom or a $C_1$-$C_{20}$ alkyl group, and if R is a $C_1$-$C_{20}$ alkyl group, it is preferably a methyl group. R may be bonded to any carbons of the naphthalene ring in the naphthotriazole ring, but if the carbon atoms fused to the triazole ring are in the 1 position and the 2 position, R is preferably bonded to the 3 position, the 5 position, or the 8 position.

In the formula (2), n is an integer of 0 to 3, and is preferably 1. In the formula (2), —($SO_3H$) may be bonded to any carbon atoms of the naphthalene ring in the naphthotriazole ring. When the carbon atoms fused to the triazole ring are in the 1 position and the 2 position, the position of —($SO_3H$) in the naphthalene ring is preferably in the 4 position, the 6 position, or the 7 position if n=1; the position is preferably in the 5 position and the 7 position, and in the 6 position and the 8 position if n=2; and the position is preferably in the combination of the 3 position, the 6 position, and the 8 position if n=3. Among these, it is particularly preferable that R is a hydrogen atom and n is 1 or 2.

In formula (3), Y represents a $C_1$-$C_{20}$ alkyl group optionally having a substituent, a vinyl group optionally having a substituent, or an aryl group optionally having a substituent. Among these, Y is preferably an aryl group optionally having substituents, still more preferably a naphthyl group optionally having substituents, and particularly preferably a naphthyl group substituted with an amino group and a sulfo group as substituents.

In formula (3), Z is defined in the same way as X in the formula (2), and represents a nitro group or an amino group optionally having a substituent, and is preferably a nitro group.

The compound with a biphenyl skeleton is preferably a compound shown in the following formula (4) or a salt thereof.

[Formula 4]

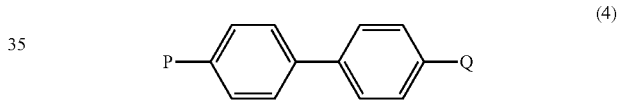

In the formula (4), P and Q each independently represent a nitro group, an amino group optionally having a substituent, a carbonylamide group optionally having a substituent, a naphthotriazole group optionally having a substituent, a $C_1$-$C_{20}$ alkyl group optionally having a substituent, a vinyl group optionally having a substituent, an amide group optionally having a substituent, a ureido group optionally having a substituent, an aryl group optionally having a substituent, or a carbonyl group optionally having a substituent, but are not limited thereto. In order to increase the fluorescence emission of the compound with a biphenyl skeleton, P and/or Q preferably do not have an azo group.

The compound represented by the formula (4) is preferably a compound represented by the following formula (5).

[Formula 5]

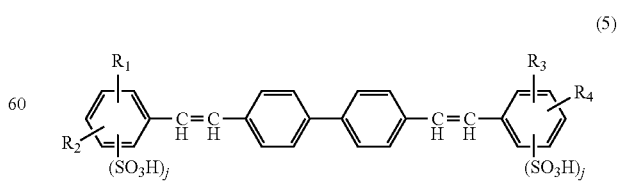

In the formula (5), j independently indicates an integer from 0 to 2. The positions where —($SO_3H$) is bonded are preferably the 2 position, the 4 position, and the 6 position, and particularly preferably the 4 position if the carbon atom bonded to —CH═CH— is in the 1 position.

In the formula (5), $R_1$, $R_2$, $R_3$, and $R_4$ are each independently a hydrogen atom, a $C_1$-$C_4$ alkyl group, a $C_1$-$C_4$ alkoxy group, an aralkyloxy group, an alkenyloxy group, a $C_1$-$C_4$ alkylsulfonyl group, a $C_6$-$C_{20}$ arylsulfonyl group, a carbonamide group, a sulfonamide group, or a carboxyalkyl group. The positions where $R_1$ to $R_4$ are bonded are not particularly limited, but are preferably the 2 position, the 4 position, and the 6 position and particularly preferably the 4 position if the carbon atom bonded to the vinyl group is in the 1 position.

Examples of $C_1$-$C_4$ alkyl groups include, for example, methyl, ethyl, propyl, n-butyl, sec-butyl, tert-butyl, and cyclobutyl groups.

Examples of $C_1$-$C_4$ alkoxy groups include methoxy, ethoxy, propoxy, n-butoxy, sec-butoxy, tert-butoxy, and cyclobutoxy groups.

Examples of aralkyloxy groups include $C_7$-$C_{18}$ aralkyloxy groups.

Alkenyloxy groups include, for example, $C_1$-$C_{18}$ alkenyloxy groups.

$C_1$-$C_4$ alkylsulfonyl groups include, for example, methylsulfonyl groups, ethylsulfonyl groups, propylsulfonyl groups, n-butylsulfonyl groups, sec-butylsulfonyl groups, tert-butylsulfonyl groups, and cyclobutylsulfonyl groups.

Examples of $C_6$-$C_{20}$ arylsulfonyl groups include phenyl sulfonyl groups, naphthyl sulfonyl groups, and biphenyl sulfonyl groups.

The compound represented by the formula (5) can be prepared by known methods. For example, it can be synthesized by condensing 4-nitrobenzaldehyde-2-sulfonic acid with phosphonate, and then by reducing the nitro group.

Specific examples of the compound shown in formula (5) include the following compound described in JP 4-226162 A.

[Formula 6]

(Compound example 1-5)

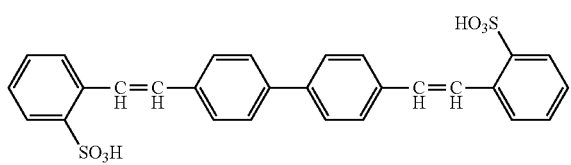

The salts of the compounds shown in formulas (1) to (5) mean that the free acid of each compound shown in each of the formulas forms salts with inorganic cations or organic cations. Examples of inorganic cations include each cation of alkali metals (e.g., lithium, sodium, and potassium) or ammonium ($NH_{4+}$). Examples of organic cations include organic ammonium expressed in the following formula (D).

[Formula 7]

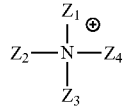

(D)

In formula (D), $Z_1$ to $Z_4$ each independently represent a hydrogen atom, an alkyl group, a hydroxyalkyl group, or a hydroxyalkoxyalkyl group, and at least one of $Z_1$ to $Z_4$ is a group other than a hydrogen atom.

Specific examples of $Z_1$ to $Z_4$ include the following:

$C_1$-$C_6$ alkyl groups such as methyl groups, ethyl groups, butyl groups, pentyl groups, hexyl groups, and preferably $C_1$-$C_4$ alkyl groups;

hydroxy $C_1$-$C_6$ alkyl groups such as hydroxymethyl groups, 2-hydroxyethyl groups, 3-hydroxypropyl groups, 2-hydroxypropyl groups, 4-hydroxybutyl groups, 3-hydroxybutyl groups, 2-hydroxybutyl, and preferably hydroxy $C_1$-$C_4$ alkyl groups; and hydroxy $C_1$-$C_6$ alkoxy $C_1$-$C_6$ alkyl groups such as hydroxyethoxymethyl groups, 2-hydroxyethoxyethyl groups, 3-hydroxyethoxypropyl groups, 3-hydroxyethoxybutyl groups, 2-hydroxyethoxybutyl groups, and preferably hydroxy $C_1$-$C_4$ alkoxy $C_1$-$C_4$ alkyl groups.

Among these inorganic cations or organic cations, each cation such as lithium, sodium, potassium, monoethanolamine, diethanolamine, triethanolamine, monoisopropanolamine, diisopropanolamine, triisopropanolamine, and ammonium is more preferred, and each inorganic cation of lithium, ammonium, or sodium is particularly preferable.

Since polarized light-emitting pigments with the above structure do not have azo groups in their molecules, the absorption of light due to azo bonds is suppressed. In particular, a compound with a stilbene skeleton exhibits a light-emitting effect when irradiated with ultraviolet light, the presence of a strong carbon-carbon double bond in the stilbene skeleton stabilizes the molecule. Therefore, a polarized light-emitting element using a polarized light-emitting pigment with such a specific structure can absorb light and utilize the energy to polarize and emit light in the visible region.

(Other Pigments)

The polarized light-emitting element exhibiting the above characteristics may further include at least one of fluorescent dyes and/or organic dyes different from the polarized light-emitting dye described above within a range that does not inhibit the polarization performance of the polarized light-emitting element. Examples of fluorescent dyes used in combination include C.I. Fluorescent Brightener 5, C.I. Fluorescent Brightener 8, C.I. Fluorescent Brightener 12, C.I. Fluorescent Brightener 28, C.I. Fluorescent Brightener 30, C.I. Fluorescent Brightener 33, C.I. Fluorescent Brightener 350, C.I. Fluorescent Brightener 360, and C.I. Fluorescent Brightener 365.

Examples of organic dyes include C.I. Direct Yellow 12, C.I. Direct Yellow 28, C.I. Direct Yellow 44, C.I. Direct Orange 26, C.I. Direct Orange 39, C.I. Direct Orange 71, C.I. Direct Orange 107, C.I. Direct Red 2, C.I. Direct Red 31, C.I. Direct Red 79, C.I. Direct Red 81, C.I. Direct Red 247, C.I. Direct Blue 69, C.I. Direct Blue 78, C.I. Direct Green 80, and C.I. Direct Green 59. These organic dyes may be free acids or may be alkali metal salts (e.g., Li, Na, K salts), ammonium salts, or salts of amines.

<Substrate>

The polarized light-emitting element is obtained by orienting the polarized light-emitting pigment. Examples of the orientation method include, but not restricted to, a method for orienting a polarized light-emitting pigment by inclusion of the polarized light-emitting pigment in a substrate and orientation of the entire substrate. The substrate used in the present invention is not particularly restricted as long as it can contain the polarized light-emitting pigment and can be oriented. For example, such a substrate preferably contains a hydrophilic polymer that adsorb a polarized light-emitting pigment and can be crosslinked by a boron derivative or the like, and is more preferably a hydrophilic polymer film obtained by forming the hydrophilic polymer. The hydrophilic polymer is preferably, but not limited to, a polyvinyl alcohol-based resin and a starch-based resin, for example. The hydrophilic polymer preferably contains a polyvinyl alcohol-based resin or a derivative thereof from the viewpoint of dyeability, workability, and crosslinking of the polarized light-emitting pigment, and more preferably contains polyvinyl alcohol. Examples of the polyvinyl alcohol-based resin or derivative thereof include polyvinyl alcohol or a derivative thereof and a resin obtained by modifying either polyvinyl alcohol or a derivative thereof with an olefin such as ethylene and propylene, or an unsaturated carboxylic acid such as crotonic acid, acrylic acid, methacrylic acid, and maleic acid. Among these, the substrate is preferably a film made from polyvinyl alcohol or a polyvinyl alcohol derivative that is partially esterified, in terms of adsorption and orientation of the polarized light-emitting pigment.

Hereinafter, a method of fabricating the polarized light-emitting element of the present invention using a substrate containing a polyvinyl alcohol-based resin is illustrated. As the substrate containing the polyvinyl alcohol-based resin, for example, a commercially available product may be used, or the substrate may be prepared by forming a film of the polyvinyl alcohol-based resin. The film forming method of polyvinyl alcohol-based resin is not particularly limited, but for example, a known film forming method can be employed, such as a method for melt extruding hydrous polyvinyl alcohol, a flow-expansion film forming method, a wet film forming method, a gel film forming method (a polyvinyl alcohol aqueous solution is cooled and gelled, and then the solvent is extracted and removed), a casting film forming method (a polyvinyl alcohol aqueous solution is poured onto a base and dried), and a method using a combination thereof. The thickness of the substrate can be appropriately designed, but is usually 10 to 100 μm, and preferably 20 to 80 μm.

(Swelling Process)

In the case of a polyvinyl alcohol-based resin, swelling treatment may be performed to facilitate the adsorption of polarizing light emitting pigments. The swelling treatment is preferably performed by immersing the substrate in a swelling liquid at 20 to 50° C. for 30 seconds to 10 minutes, and the swelling liquid is preferably water. The stretching ratio of the substrate by the swelling liquid is preferably adjusted to 1.00 to 1.50 times, and more preferably to 1.10 to 1.35 times.

(Dyeing Process)

At least one of the polarized light-emitting pigments is impregnated and adsorbed on the substrate obtained by applying the swelling treatment in the swelling process. The dyeing process is not particularly limited as long as a polarized light-emitting pigment is impregnated and adsorbed on the substrate, but examples thereof include a method of immersing the substrate in a dyeing solution containing the polarized light-emitting pigment and a method of coating the substrate with the dyeing solution to adsorb it. Of these, the method of immersing the substrate in the dyeing solution containing the polarized light-emitting pigment is preferable. The concentration of the polarized light-emitting pigment in the dyeing solution is not particularly limited as long as the polarized light-emitting pigment is sufficiently adsorbed into the substrate, but is preferably 0.0001 to 1% by mass and more preferably 0.001 to 0.5% by mass in the dyeing solution, for example.

The temperature of the dyeing solution in the dyeing process is preferably 5 to 80° C., more preferably 20 to 50° C., and particularly preferably 40 to 50° C. The time for immersing the substrate in the dyeing solution is important when controlling a value of an order parameter indicated by the polarized light-emitting element. In order to control the value of the order parameter to the desired range, the time for immersing the substrate in the dyeing solution is preferably adjusted between 6 and 20 minutes, and is more preferably between 7 and 10 minutes.

The polarized light-emitting pigment contained in the dyeing solution may be used in a single type alone or in combination with two or more types. Since the polarized light-emitting pigment has different light-emitting colors depending on the compound, by the inclusion of one or more of the polarized light-emitting pigments in the substrate, the light-emitting colors generated can be appropriately adjusted to be a variety of colors. If necessary, the dyeing solution may further contain one or more organic dyes and/or fluorescent dyes different from the polarized light-emitting pigments.

When fluorescent dyes and/or organic dyes are used in combination, it is possible to select the dyes to be blended and adjust the blending rate or the like in order to adjust colors of the polarizing element as desired. The blending ratio of fluorescent dyes or organic dyes is not particularly limited, but generally, it is preferable to use a total amount of these fluorescent dyes and/or organic dyes in the range of 0.01 to 10 parts by mass based on 100 parts by mass of the polarizing element.

In addition to each of the dyes, a dyeing auxiliary may be further used in combination if necessary. Examples of dyeing auxiliaries include sodium carbonate, sodium hydrogen carbonate, sodium chloride, sodium sulfate (mirabilite), anhydrous sodium sulfate and sodium tripolyphosphate, and sodium sulfate is preferable. The content of the dyeing auxiliary can be arbitrarily adjusted in accordance with the immersion time and temperature during dyeing based on the dyeability of the dichromatic pigment used, but is preferably 0.0001 to 10% by mass and more preferably 0.0001 to 2% by mass in the dyeing solution.

After the dyeing process, a pre-cleaning process can optionally be carried out to remove the dyeing solution adhered to the surface of the substrate in the dyeing process. By carrying out the pre-cleaning process, it is possible to suppress the migration of the remaining polarized light-emitting pigment on the surface of the substrate into a liquid to be treated next. In the pre-cleaning process, water is generally used as a cleaning solution. A cleaning method is preferably to immerse a substrate dyed in a cleaning liquid, while it can also be cleaned by applying the cleaning solution to the substrate. The cleaning time is not particularly limited, but is preferably 1 to 300 seconds, and more preferably 1 to 60 seconds. The temperature of the cleaning solution in this pre-cleaning process needs to be a temperature that does not dissolve materials constituting the substrate, and the cleaning treatment is generally applied at 5 to 40° C. Since the performance of the polarizing element is not significantly affected even without the pre-cleaning process, the pre-cleaning process can be omitted.

(Crosslinking Process)

After the dyeing process or the pre-cleaning process, the substrate can contain a crosslinking agent. The method of inclusion of the crosslinking agent in the substrate is preferably to immerse the substrate in a treatment solution containing the crosslinking agent, while the treatment solution may be applied or coated on the substrate. As a crosslinking agent in the treatment solution, for example, a solution containing boron compounds is used. Examples of boron compounds include inorganic compounds such as boric acid, borax, boron oxide and boron hydroxide, and boronic acids such as alkenylboronic acid, arylboronic acid, alkylboronic acid, boronate esters, trifluoroborate or salts thereof. Boric acid and borax are preferable, and boric acid is particularly preferable. The solvent in the treatment solution is preferably, but not limited to, water. The concentration of the boron derivative in the treatment solution is preferably 0.1 to 15% by mass, and more preferably 0.1 to 10% by mass. The temperature of the treatment solution is preferably 30 to 80° C., and more preferably 40 to 75° C. The treatment time for this crosslinking process is preferably 30 seconds to 10 minutes, and more preferably 1 to 6 minutes. By this crosslinking process, the resulting polarized light-emitting element exhibits high contrast. This is an excellent effect that may be completely unexpected from the function of boron compounds used in the conventional technology to improve water resistance or light transmissivity. In the crosslinking process, fixing treatment may be further performed together with an aqueous solution containing a cation or cationic polymer compound, if necessary. The cation is an ion derived from a metal such as sodium, potassium, calcium, magnesium, aluminum, iron, or barium, and preferably a divalent ion. Specific examples include cations derived from calcium chloride, magnesium chloride, iron chloride, and barium chloride. The fixing treatment enables the immobilization of a polarized light-emitting pigment in the substrate. The cationic polymer compounds include, for example, dicyanamide and formalin polymerization condensation products as dicyanides, dicyandiamide-diethylenetriamine polycondensation products as polyamines, epichlorohydrin-dimethylamine addition polymerization products as polycations, dimethyldiallylammonium chloride-dioxide ion copolymerization products, diallylamine salt polymerization products, dimethyldiallylammonium chloride polymerization products, polymerization products of allylamine salts, dialkylaminoethyl acrylate quaternary salt polymerization products, which are used at this time.

(Stretching Process)

After the crosslinking process, the stretching process is carried out. The stretching process is performed by uniaxially stretching the substrate in a certain direction. A stretching method can be either a wet stretching method or a dry stretching method. The stretching ratio of the substrate is also important when controlling the value of the order parameter. In order to control the value of the order parameter indicated by the polarized light-emitting element to the desired range, the stretching ratio of the substrate is preferably 3.3 times or more, more preferably 3.3 to 8.0 times, still more preferably 3.5 to 6.0 times, and particularly preferably 4.0 to 5.0 times.

In the wet stretching method, it is preferable to stretch the substrate in water, a water-soluble organic solvent, or a mixture thereof. More preferably, the stretching process is performed while the substrate is immersed into a solution containing at least one crosslinking agent. For example, a boron compound in the crosslinking process can be used as the crosslinking agent. Preferably, the stretching treatment can be performed in the treatment solution used in the crosslinking process. The stretching temperature is preferably 40 to 60° C., and more preferably 45 to 58° C. The stretching time is usually 30 seconds to 20 minutes, and preferably 2 to 7 minutes. The wet stretching process may be carried out in a single step of stretching or may be carried out in two or more steps of multiple stretching. The stretching treatment may be optionally performed before the dyeing process, and in this case the orientation of the polarized light-emitting pigment can also be performed at the time of dyeing.

In the dry stretching method, when a stretching medium is an air medium, it is preferable to stretch the substrate at a temperature of the air medium between room temperature and 180° C. The humidity is preferably in an atmosphere of 20 to 95% RH. Examples of the heating method of substrates include a roll-to-zone stretching method, a roll-heated stretching method, a hot-rolled stretching method, and an infrared-heated stretching method, but are not limited to these stretching methods. The dry stretching process may be carried out in a single step of stretching or may be carried out in a two or more steps of multiple stretching. In the dry stretching process, the substrate containing the polarized light-emitting pigment can be stretched while the boron derivative is included in the substrate, or the substrate can be stretched after the boron compound is included in the substrate. However, it is preferable to perform the stretching treatment after the boron compound is included in the substrate. The temperature at which the boron derivative is applied is preferably 40 to 90° C., and more preferably 50 to 75° C. The concentration of the boron compound is preferably 1 to 10%, and more preferably 3 to 8%. The treatment time for the dry stretching is preferably 1 to 15 minutes, more preferably 2 to 12 minutes, and still more preferably 3 to 10 minutes.

(Cleaning Process)

After the stretching process is carried out, the cleaning process can be performed to clean the surface of the substrate since the precipitation of the crosslinking agent or foreign substances may adhere to the surface of the substrate. The cleaning time is preferably 1 second to 5 minutes. A cleaning method is preferably to immerse a substrate in a cleaning liquid, while it can also be cleaned by applying or coating the cleaning liquid to the substrate. Water is preferable as the cleaning liquid. The cleaning treatment may be carried out in a single step or in two or more steps of the multiple treatment. The temperature of the cleaning solution in the cleaning process is not particularly limited, but is usually 5 to 50° C., preferably 10 to 40° C., and may be room temperature.

In addition to water, examples of solvents for solutions or treatment solutions used in each of the processes include dimethyl sulfoxide; N-methylpyrrolidone; alcohols such as methanol, ethanol, propanol, isopropyl alcohol, glycerin, ethylene glycol, propylene glycol, diethylene glycol, triethylene glycol, tetraethylene glycol or trimethylolpropane; and amines such as ethylenediamine and diethylenetriamine. The solvents for the solutions or treatment liquids are preferably, but not limited to, water. The solvents for these solutions or treatment liquids may be used in a single type alone or may be used in a mixture of two or more types.

(Drying Process)

The drying process of the substrate is performed after the cleaning process. The drying treatment can be performed by natural drying, but in order to further increase the drying efficiency, it is possible to perform compression by rolls, removal of surface moisture by air knives, water-absorbing rolls or the like. Furthermore, it is also possible to perform air blast drying. The temperature of the drying treatment is preferably 20 to 100° C., and more preferably 60 to 100° C. The drying time is preferably 30 seconds to 20 minutes, and more preferably 5 to 10 minutes.

A polarized light-emitting element according to the present invention can be fabricated by the production method described above, and the resulting polarized light-emitting element has high durability and exhibits polarized light emission with high polarization (contrast).

In addition to the production method described above, it is also possible to fabricate a polyvinyl alcohol-based resin film containing a polarized light-emitting pigment in advance, and then perform each of the swelling, stretching, cleaning, crosslinking, and drying processes without undergoing the dyeing process to fabricate the polarized light-emitting element of the present invention.

A polarized light-emitting element according to the present invention can be fabricated by the production method illustrated above, and the resulting polarized light-emitting element has high durability and exhibits polarized light emission with high polarization (contrast).

The polarized light-emitting element polarizes and emits light in the visible region by using the energy obtained from absorption of light, especially the absorption of light in the ultraviolet region. In order to further improve the difference in brightness of the polarized light emission, it is preferable to have the polarized light emission with high polarization (contrast). Because light emitted by a polarized light-emitting element is polarized in the visible region, when the polarized light-emitting element is observed via a general polarizing plate having a polarization function for the light in the visible region, the polarized light emission and non-light emission can be seen by changing the angle of the axis of the polarizing plate. The polarization of polarized light emitted by the polarized light-emitting device is, for example, 70% or more, preferably 80% or more, more preferably 90% or more, still more preferably 95% or more, and particularly preferably 99% or more. The higher the contrast, the more preferable it is. The higher the polarization, the higher the tendency. When the polarized light-emitting element transmits light in the visible region without absorbing it, the light transmittance of the polarized light-emitting element in the visible region is, for example, 60% or more, preferably 70% or more, more preferably 80% or more, still more preferably 85% or more, and particularly preferably 90% or more, in terms of the luminous correction transmittance. Since such polarized light-emitting element has high polarization, the absorption of light in the visible region is reduced in the non-light-emitting state, and thereby a polarized light-emitting element with high transparency can be obtained.

The optical element of the present invention can be obtained by laminating the polarized light-emitting element and the non-light-emitting polarizing element thus obtained. FIG. 1 shows an optical element 3 of the present invention, wherein the polarized light-emitting element 1 is laminated with the non-light-emitting polarizing element 2.

When a non-light-emitting polarizing element 2 is an absorption polarizing element, it is preferable to laminate it so that the polarizing axis of the absorption polarizing element is orthogonal to the light-emitting polarizing axis of a polarized light-emitting element 1. This means that the absorbing axis of the absorption polarizing element and the light-emitting polarizing axis of the polarizing light-emitting element are laminated so as to be parallel. When the non-light-emitting polarizing element 2 is a reflection polarizing element, it is preferable to laminate it so that the transmissive polarizing axis of the reflection polarizing element is orthogonal to the light-emitting polarizing axis of the polarized light-emitting element 1. This means that the reflective polarizing axis of the reflection polarizing element and the light-emitting polarizing axis of the polarized light-emitting element are laminated so as to be parallel. Although the bonding layer is omitted in both FIG. 1 and the subsequent drawings, various bonding methods such as bonding agents, adhesives, and plasma joint treatment can be used for lamination. Examples of bonding agents include water-soluble bonding agents such as polyvinyl alcohol or an aqueous solution of modified polyvinyl alcohol to which a crosslinking agent such as glyoxal is added if necessary, thermosetting bonding agents such as epoxy-, urethane-, and acrylic-based urethane-based bonding agents that are thermosetting, and ultraviolet-curing bonding agents containing an ultraviolet-curing resin and a photopolymerization initiator, but the bonding agents are not particularly restricted as long as light can be transmitted and the desired bonding strength can be obtained. Examples of adhesives include acrylic adhesives cross-linked with an acrylic polymer consisting of acrylic acid or a copolymer of multiple acrylic esters using a curing agent such as isocyanate, and silicone adhesives consisting of a silicone resin. The plasma bonding treatment may also be used, in which a polarizing element surface is activated by atmospheric pressure plasma treatment in inert gas to be laminated and bonded.

Figure 2:
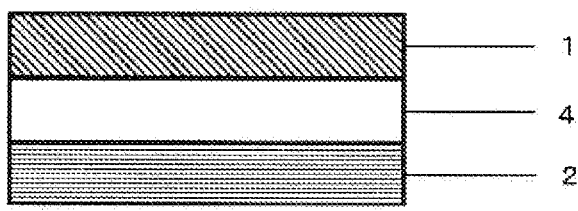
FIG. 2 is a configuration diagram showing another form of the optical element of the present invention.

As shown in FIG. 2, when laminating the polarized light-emitting element 1 and the non-light-emitting polarizing element 2, a support 4 may be used between them. The support is not particularly restricted as long as it is transparent enough to allow light to be transmitted, but if the support is not intentionally colored from the viewpoint of color tone and designability, it is preferably as transparent as possible. The visible light transmittance at 400 nm to 700 nm is 80% to 100%, more preferably 85% to 98%, and still more preferably about 90% to 95%. Examples of support materials include, but not particularly restricted to, glasses and resins. As the resins, for example, various resins such as cellulose resins such as triacetylcellulose, acrylic resins, nylon resins, and polyolefin resins can be used. Various additives such as plasticizers and fillers can be added to the support consisting of these resins if necessary. This support may be used in one layer or in two or more layers. The support may be bonded to each or any of the non-light-emitting polarizing elements or the polarized light-emitting elements with a bonding agent or an adhesive, or may be directly laminated without the bonding agent if it has sufficient practical adhesion to the polarizing elements. The adhesive or the bonding agent is not particularly restricted, but it is preferable to use a water-soluble bonding agent, a thermosetting bonding agent, a ultraviolet curing bonding agent or an acrylic-based adhesive.

Figure 3:
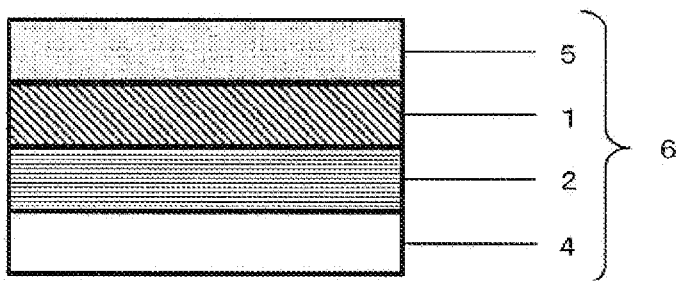
FIG. 3 is a configuration diagram of a polarizing plate of the present invention.
Figure 4:
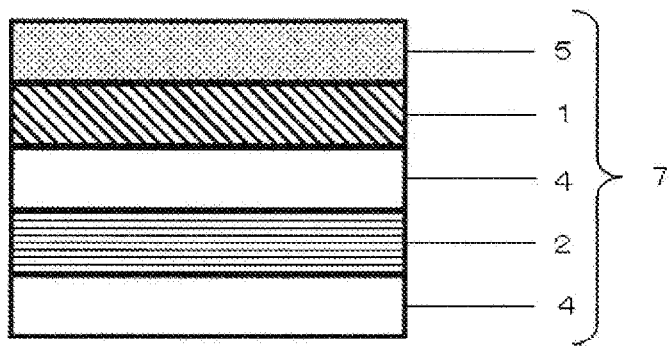
FIG. 4 is a configuration diagram showing one form of the polarizing plate of the present invention.
Figure 5:
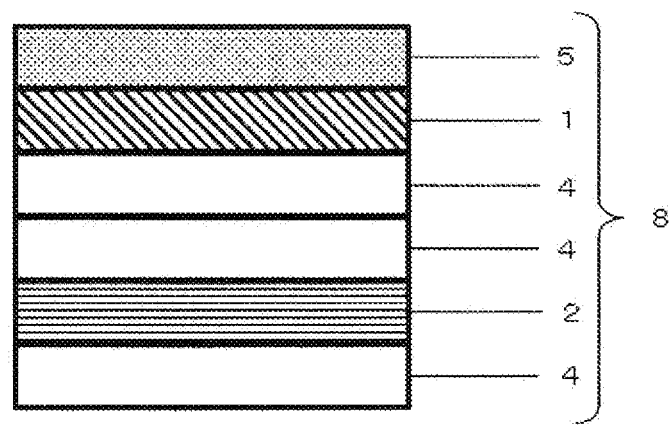
FIG. 5 is a configuration diagram showing one form of the polarizing plate of the present invention.

An optical element of the present invention may comprise a support provided on one side of the optical element, or both sides of the optical element may be sandwiched by the support in order to protect the surface. The means for providing or sandwiching the support is not particularly restricted, but when using an bonding agent or an adhesive, it is preferable to use a water-soluble bonding agent, a thermosetting bonding agent, an ultraviolet-curing bonding agent or an acrylic-based adhesive. As the support material, various resins such as glass, cellulose resins such as triacetylcellulose, acrylic resins, nylon resins, and polyolefin resins can be used. For the support and bonding agent placed on the polarized light-emitting element side, the transmittance of the substrate or the bonding agent layer at a wavelength of light absorbed by the element is preferably 50 to 100%, more preferably 70 to 98%, and still more preferably about 80 to 95%, so as not to interfere with the emission of the polarized light-emitting element. Preferably, the support in the present invention does not absorb light of the absorption wavelength of the polarized light-emitting element. For example, since an ultraviolet absorbent is often contained in the support, it is preferable to use a support that does not contain the ultraviolet absorbent when an ultraviolet light has an absorption wavelength of 350 to 380 nm for the polarized light-emitting element. FIG. 3 shows a polarizing plate 6 of the present invention, in which an optical element 3 of the present invention is sandwiched by a support 4 and a support 5 that transmits light of the wavelength necessary for polarized light emission. As shown in FIG. 4, the support 4 is present between the polarized light-emitting element 1 and the non-light-emitting polarizing element 2, and they may be a configuration of a polarizing plate 7 of the present invention sandwiched by the support 4 and the support 5. As shown in FIG. 5, the polarizing light-emitting element 1 is sandwiched by the supports 4 and 5, while the non-light-emitting polarizing element 2 is sandwiched by the supports 4 and 4, and each of them may be laminated to be a configuration of a polarizing plate 8 of the present invention.

For example, the method of fabricating the polarizing plate of the present invention with the optical element sandwiched by the supports involves bonding the support to one side of the non-light-emitting polarizing element and the light-emitting polarizing element fabricated as described above using bonding agent or the like. Then, the polarizing elements may be bonded together so as to face each other using a bonding agent or the like.

Figure 6:
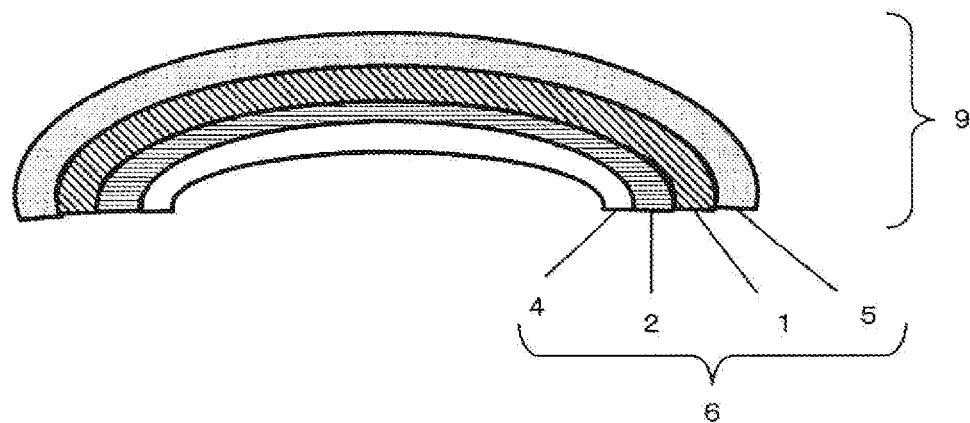
FIG. 6 is a configuration diagram of an eyewear lens of the present invention.
Figure 7:
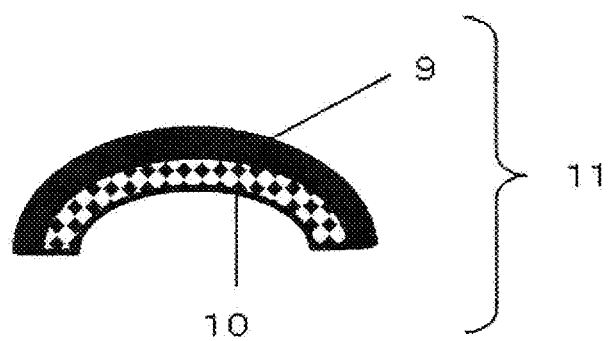
FIG. 7 is a configuration diagram showing another form of the eyewear lens of the present invention.

An eyewear lens of the present invention can be obtained by processing the lens using the polarizing plate of the invention obtained by sandwiching the optical element of the invention thus obtained. The eyewear lens of the present invention refers to a product that includes the polarizing plate of the present invention bent into a lens shape. FIG. 6 shows an eyewear lens 9 of the present invention obtained by bending a polarizing plate 6 of the present invention. For example, the method of fabricating the eyewear lens of the present invention involves processing the polarizing plate into a desired curved surface shape using a bending machine, and then cutting it into the desired shape. The eyewear lens of the present invention needs to be arranged so that the polarized light-emitting element side eventually becomes a convex surface. Next, when insert molding is performed, the insert molding is done so that the polarized light-emitting element is eventually on the convex surface side. A resin to be injected at this time can be selected as appropriate, such as polycarbonate or polyamide. Further, hard coating or antifouling treatment can be applied to the convex surface side, and the lens shape can be finished by cutting and polishing to the desired shape. FIG. 7 shows a form of an eyewear lens 11 of the present invention processed into a lens shape as described above using such insert molding resin 10 (hard coating and antifouling treatment layers are omitted).

Furthermore, the eyewear of the present invention can be obtained by attaching the eyewear lens of the present invention to the frame of sunglasses or goggles.

EXAMPLES

Hereinafter, the present invention will be further described in detail by Examples, but the present invention is not limited to such Examples.

Example 1

(Preparation of Polarized Light-Emitting Element)

A polyvinyl alcohol film (VF-PS #7500 manufactured by Kuraray Co., Ltd) having a thickness of 75 µm was immersed in 40° C. warm water for 3 minutes to swell the film. The film obtained by swelling was immersed for 10 minutes in a 45° C. aqueous solution containing 0.05 parts of 4,4'-bis-(sulfostyl) biphenyl 2 sodium aqueous solution (Tinopal NFW Liquid manufactured by BASF) as described in Compound Examples 5-1, 1.0 part of mirabilite, and 1,000 parts of water. The resulting film was immersed into a 3% boric acid aqueous solution at 50° C. for 5 minutes and stretched 5.0 times. The film obtained by stretching was rinsed with water at room temperature for 20 seconds while maintaining tension, and then dried to obtain a polarized light-emitting element. When the resulting polarized light-emitting element was measured using a spectrophotometer (U-4100 manufactured by Hitachi, Ltd.), the absorption peak was 370 nm, the luminous correction single transmittance (Ys) was 92.3%, and the value of the order parameter (OPD) was 0.886.

(Lamination of Support)

As a support, both sides of an ultraviolet-transmitting triacetylcellulose film (ZRD-60 manufactured by FUJIFILM Corporation) having a transmittance of 90% at 370 nm were treated using 1.5 standard sodium hydroxide aqueous solution at 35° C. for 10 minutes, rinsed with water, and then dried at 70° C. for 10 minutes. The triacetylcellulose film treated with sodium hydroxide was laminated to one side of the polarized light-emitting element fabricated above via an aqueous solution containing a 4% polyvinyl alcohol resin (NH-26 manufactured by JAPAN VAM & POVAL CO., LTD.), and the other side of the polarized light-emitting element was bonded with a protective film (NSA-33T manufactured by Sun A. Kaken Company, Limited) and dried at 60° C. for 10 minutes to obtain a polarized light-emitting element with a triacetylcellulose film transmitting an ultraviolet ray on one side.

(Lamination of Absorption Polarizing Element and Support)

As the absorption polarizing element, a dye-based polarizing element (Grey-30 manufactured by Polatechno Co., Ltd.) with a single transmittance Ys=29%, transmittance hue a*=0.64, transmittance hue b*=1.03, and luminous correction polarization Py=99.9% was used, and an absorption polarizing element with a triacetylcellulose film absorbing an ultraviolet ray on one side was obtained by the same procedure as above, except that a triacetylcellulose film (Tacphan P980GL manufactured by TacBright Optronics Corporation) containing an ultraviolet absorbent with a transmittance of 0.5% or less at 370 nm was used as the substrate.

(Fabrication of Polarizing Plate with Optical Element of the Present Invention Sandwiched by Support)

The polarized light-emitting element with a triacetylcellulose film transmitting ultraviolet rays on one side and an absorption polarizing element with a triacetylcellulose film transmitting almost no ultraviolet rays on one side were each peeled off their respective protective films. The polarizing elements were arranged and laminated so that each of the polarizing elements was facing each other (the surfaces with the protective film peeled off were facing each other) and so that the light-emitting axis direction of the polarized light-emitting element and the absorption axis direction of the absorption polarizing element were parallel, via an aqueous solution containing a 4% polyvinyl alcohol resin (NH-26 manufactured by JAPAN VAM & POVAL CO., LTD.). Then, a polarizing plate 6 of the present invention, in which the optical element of the present invention is sandwiched by the support as shown in FIG. 3, was obtained by drying at 60° C. for 10 minutes.

Example 2

Instead of an absorption polarizing plate, a wire-grid polarizing element (PFU01C manufactured by Polatechno Co., Ltd.) with a polarization transmittance of 96.1=% and a polarization reflectance of 0.21% was used at 550 nm as a reflective polarizer, and a polarizing plate of the present invention was obtained by bonding the polarized light-emitting element with a triacetylcellulose film transmitting an ultraviolet ray on one side fabricated in Example 1 using an adhesive, by arranging so that the light-emitting axis direction of the polarized light-emitting element and the reflection axis direction of the reflection polarizer were parallel.

(Evaluation of Example 1)

The polarized light-emitting layer exhibited pale light emission when the polarized light-emitting element side of the polarizing plate of the present invention was exposed to sunlight in fine weather. In this state, the surrounding was observed from the absorption polarizing element side with the absorption axis of the polarizing element horizontal to the ground, but no glare was felt (unified opinion of 10 monitors). In a place where sunlight reflected from the surface of the water is strong, the polarized light-emitting element was arranged so as to be on the water surface side. When the surface of the water was observed at a position where the polarized light-emitting axis was almost parallel to the surface of the water and the transmission axis of the absorption polarizing element was orthogonal (the absorption axis was parallel to the light-emitting axis of the polarized light-emitting element), the polarized light-emitting element strongly emitted, but when the surface of the water was observed from the absorption polarizer side, no glare was felt, and the reflection of the surface of the water was greatly reduced, resulting in good visibility (unified opinion by 10 monitors).

(Evaluation of Example 2)

When the polarizing plate of the present invention was evaluated in the same manner as in Example 1, it exhibited stronger light emission than in Example 1. In this state, the surrounding was observed from the reflection polarizer side with the reflection axis of the polarizer horizontal to the ground, but no glare was felt (unified opinion of 10 monitors). In a place where sunlight reflected from the surface of the water is strong, the polarized light-emitting element was arranged so as to be on the water surface side. When the surface of the water was observed at a position where the polarized light-emitting axis was almost parallel to the surface of the water and the transmission axis of the reflection polarizing element was orthogonal (the reflection axis was parallel to the light-emitting axis of the polarized light-emitting element), the polarized light-emitting element strongly emitted, but when the surface of the water was observed from the reflection polarizer side, no glare was felt, and the reflection of the surface of the water was greatly reduced, resulting in good visibility (unified opinion by 10 monitors).

Comparative Example

Figure 8:
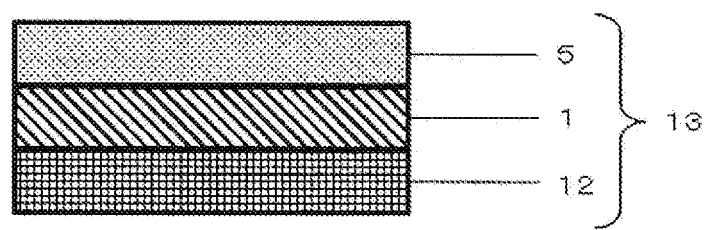
FIG. 8 is a configuration diagram of a laminate prepared in Comparative Example.

Instead of an absorption polarizing plate, a laminate 13 was obtained in which the polarized light-emitting element was sandwiched by the triacetylcellulose film transmitting ultraviolet rays and a colored triacetylcellulose film 12 as shown in FIG. 8 by the same procedure as in Example 1, except that a colored triacetylcellulose film (13SG80S-LH manufactured by IHI Corporation) a single transmittance Ys=30%, a transmittance hue a*=1.65, and a transmittance hue b*=−4.63 was used.

(Evaluation of Laminates in Comparative Examples)

When the laminates were observed in the same environment as in Example 1, the polarized light-emitting layer exhibited pale light emission when the polarized light-emitting element side was exposed to sunlight in fine weather. In this state the surrounding was observed from the side of the colored triacetylcellulose film, and it felt glaring (unified opinion of 10 monitors). In addition, in a place where the reflected light of sunlight from the surface of the water is strong, the polarized light-emitting element was arranged so as to be on the water surface side, and the surface of the water was observed from the colored triacetylcellulose film side at a position where the polarized light-emitting axis is almost parallel to the surface of the water, and it felt glaring and visibility was not good (unified opinion by 10 monitors).

INDUSTRIAL APPLICABILITY

The eyewear of the present invention can be used to estimate the intensity of ultraviolet rays outdoors by the degree of light emission, which can be used as an indicator to determine whether or not sunglasses should be worn. Furthermore, the polarized light-emitting element can be emitted by light in the ultraviolet to near-ultraviolet visible region included in external light, thereby imparting an unconventional design properties. Moreover, since emitted light is polarized, the emitted light is reflected and/or absorbed by the laminated non-light-emitting polarizing element. Therefore, the function as polarized sunglasses can be maintained.

REFERENCE SIGNS LIST

1: Polarized light-emitting element
2: Non-light-emitting polarizing element
3: Optical element of the present invention
4: Support
5: Support that transmits light at wavelength necessary for polarized light emission
6: Polarizing plate of the present invention
7: Polarizing plate of the present invention
8: Polarizing plate of the present invention
9: Eyewear lens of the present invention
10: Injection resin
11: Eyewear lens of the present invention
12: Colored triacetylcellulose film
13: Laminate

The invention claimed is:

1. An eyewear lens comprising an optical element, wherein the optical element has a side that receives incident light from an external light source and an eyeball side, and comprises a polarized light-emitting element and an absorption polarizing element, wherein the polarized light-emitting element comprises a first substrate comprising a polarized light-emitting pigment, the first substrate being supported by a first support that does not contain an ultraviolet absorbent, the first support being on said side that receives incident light from the external light source; wherein said polarized light-emitting element polarizes and emits light in a visible region and is laminated with the absorption polarizing element that comprises a second substrate and is supported by a second support that contains an ultraviolet absorbent, and absorbs and/or reflects light in the visible region, and wherein the order of lamination, from the side that receives incident light from the external light source to the eyeball side, is (1) the first support, the polarized light-emitting element, the second support, and then the absorption polarizing element; or (2) the first support, the polarized light-emitting element, the absorption polarizing element, and then the second support, and wherein the polarized light-emitting element has an absorption wavelength of 350 to 380 nm.

2. The eyewear lens according to claim 1, wherein a light-emitting polarizing axis of the polarized light-emitting element is orthogonal to a polarizing axis of the absorption polarizing element.

3. The eyewear lens according to claim 1, wherein the polarized light-emitting element and the absorption polarizing element are laminated via an adhesive layer.

4. The eyewear lens according to claim 1, wherein the polarized light-emitting element and the absorption polarizing element are laminated via a third support.

5. Eyewear comprising the eyewear lens according to claim 1.

* * * * *